United States Patent
Walker et al.

(10) Patent No.: US 7,171,328 B1
(45) Date of Patent: Jan. 30, 2007

(54) METHOD FOR MEASURING THERMAL PROPERTIES USING A LONG-WAVELENGTH INFRARED THERMAL IMAGE

(75) Inventors: Charles L. Walker, Albuquerque, NM (US); Laurence S. Costin, Albuquerque, NM (US); Jody L. Smith, Albuquerque, NM (US); Mary M. Moya, Albuquerque, NM (US); Jeffrey A. Mercier, Albuquerque, NM (US)

(73) Assignee: Sandia Corporation, Albuquerque, MN (US)

( * ) Notice: Subject to any disclaimer, the term of this patent is extended or adjusted under 35 U.S.C. 154(b) by 0 days.

(21) Appl. No.: 11/215,722

(22) Filed: Aug. 30, 2005

Related U.S. Application Data

(60) Provisional application No. 60/605,473, filed on Aug. 30, 2004.

(51) Int. Cl.
*G06F 15/00* (2006.01)
(52) U.S. Cl. .................... 702/136; 702/130
(58) Field of Classification Search ............. 702/134, 702/135, 136
See application file for complete search history.

(56) References Cited

U.S. PATENT DOCUMENTS 5,445,453 A    8/1995   Prelat
5,471,056 A  * 11/1995  Prelat .................. 250/253
6,694,064 B1 *  2/2004  Benkelman .......... 382/284

OTHER PUBLICATIONS

Dozier, J; Frew, J; "Rapid Calculation of Terrain Parameters for Radiation Modeling From Digial Elevation Data"; IEEE Transactions on Geoscience and Remote Sensing; vol. 28, issue 5; Sep. 1990; pp. 963-969.*

J. A. Sobrino et al, "Thermal Inertia Mapping from NOAA-AVHRR Data" Adv. Space Res. vol. 22, No. 5 pp. 655-667, 1998.

Mary M. Moya et al "Remote Sensing Data Exploitation for Geologic Characterization of Difficult Targets", SAND2003-3453, Sep. 2003.

* cited by examiner

*Primary Examiner*—Michael Nghiem
*Assistant Examiner*—Douglas N Washburn
(74) *Attorney, Agent, or Firm*—Carol I Ashby

(57) ABSTRACT

A method for estimating the thermal properties of surface materials using long-wavelength thermal imagery by exploiting the differential heating histories of ground points in the vicinity of shadows. The use of differential heating histories of different ground points of the same surface material allows the use of a single image acquisition step to provide the necessary variation in measured parameters for calculation of the thermal properties of surface materials.

17 Claims, 3 Drawing Sheets

METHOD FOR MEASURING THERMAL PROPERTIES USING A LONG-WAVELENGTH INFRARED THERMAL IMAGE

This application claims priority benefit from U.S. Provisional Patent Application Ser. No. 60/605,473, filed on Aug. 30, 2004, which is incorporated herein by reference.

The United States Government has rights in this invention pursuant to Department of Energy Contract No. DE-AC04-94AL85000 with Sandia Corporation.

BACKGROUND OF THE INVENTION

This invention comprises a method for remotely sensing the thermal properties of a material; among other materials, it is useful for measuring the thermal properties of rock features. To date, most remote sensing measurements of thermal rock properties (in particular, apparent thermal inertia (ATI) methods) have relied on measuring temperatures at a number of times during the diurnal cycle. While such methods are quite simple to implement, they fail to include the heating and cooling history of the region of the earth's surface being measured. One improvement in the application of ATI methods involved using images acquired both during the day and at night (Sobrino et al., 1998). When using a sun-synchronous satellite as the remote measurement platform, the dates of acquisition of the daytime and night-time images are often necessarily separated by multiple days. Additionally, the proper registration of such day image and night image pairs may prove challenging.

Prelat (U.S. Pat. No. 5,445,453) reports a method for airborne surveying to acquire, process, and calculate the apparent thermal inertia of earth surface materials during flight and by post-flight processing. Two separate airborne surveys are conducted during a diurnal solar cycle to determine the maximum and the minimum radiant temperatures of the earth surface materials. The albedo of the earth material is determined and is used to calculate the apparent thermal inertia of the earth surface materials. Spatial rectification of the two surveys is accomplished by use of differential global positioning.

SUMMARY OF THE INVENTION

This invention comprises a method measuring thermal properties of a surface material using a long-wavelength infrared thermal image. A single thermal image is sufficient for the determination of the thermal and radiative properties of a surface material using the method of this invention.

Additional objects, advantages, and novel features of the invention will become apparent to those skilled in the art upon examination of the following description or may be learned by practice of the invention. The objects and advantages of the invention may be realized and attained as particularly pointed out in the appended claims.

BRIEF DESCRIPTION OF THE DRAWINGS

The accompanying drawings, which are incorporated in and form part of the specification, illustrate embodiments of the present invention and, together with the description, serve to explain the principles of the invention.

DETAILED DESCRIPTION OF THE INVENTION

This invention comprises a method for estimating the thermal properties of earth surface materials using long-wavelength thermal imagery by exploiting the differential heating histories of ground points in the vicinity of shadows. The use of differential heating histories of different ground points of the same surface material allows the use of a single image acquisition step to provide the necessary variation in measured parameters for calculation of the thermal properties of surface materials. In some embodiments, calculations using a one-dimensional heat transfer model with time-varying boundary conditions predict surface material temperatures with significant differences (5–15° C.) as functions of local pixel sunrise and sunset times and thermal surface material parameters. The pixel-by-pixel sunrise and sunset times within a pixelated thermal image depend on the date of collection and the site's location and topography, which can be obtained from a digital elevation model (DEM). The digital elevation model represents the local topography (elevation) of the area being imaged. The surface material rock parameters (for example, emissivity, reflectance, thermal conductivity and thermal capacity or equivalently thermal inertia and thermal diffusivity) are estimated using a model with an optimization code that searches a data space of possible surface material parameters to minimize the sum-of-squares difference between pixelated model-predicted temperatures and temperatures estimated from the long-wavelength thermal bands over a number of spatial pixels. The method can produce reasonable surface material parameter estimates even in the presence of measurement errors. The basic heat-transfer model used in some embodiments does not include the effects of soil moisture and vegetation; these effects can be included by using a heat-transfer model that incorporates these features. In the illustrative embodiments described in detail herein, the method was applied to multi-spectral thermal imagery (MTI) collected from desert test sites where vegetation and moisture are minimized. Even under such desert conditions, moisture and vegetation have some impact on the quality of fit, so inclusion of a suitable model for soil moisture and vegetation is can improve the quality of the estimation of material parameters. The embodiments described herein include some simple models for soil moisture and vegetation. Comparison of estimated surface material parameters with actual material parameters for known surface materials enables identification of surface characteristics, such as, for example, the type of rocks present at the surface.

Figure 1:
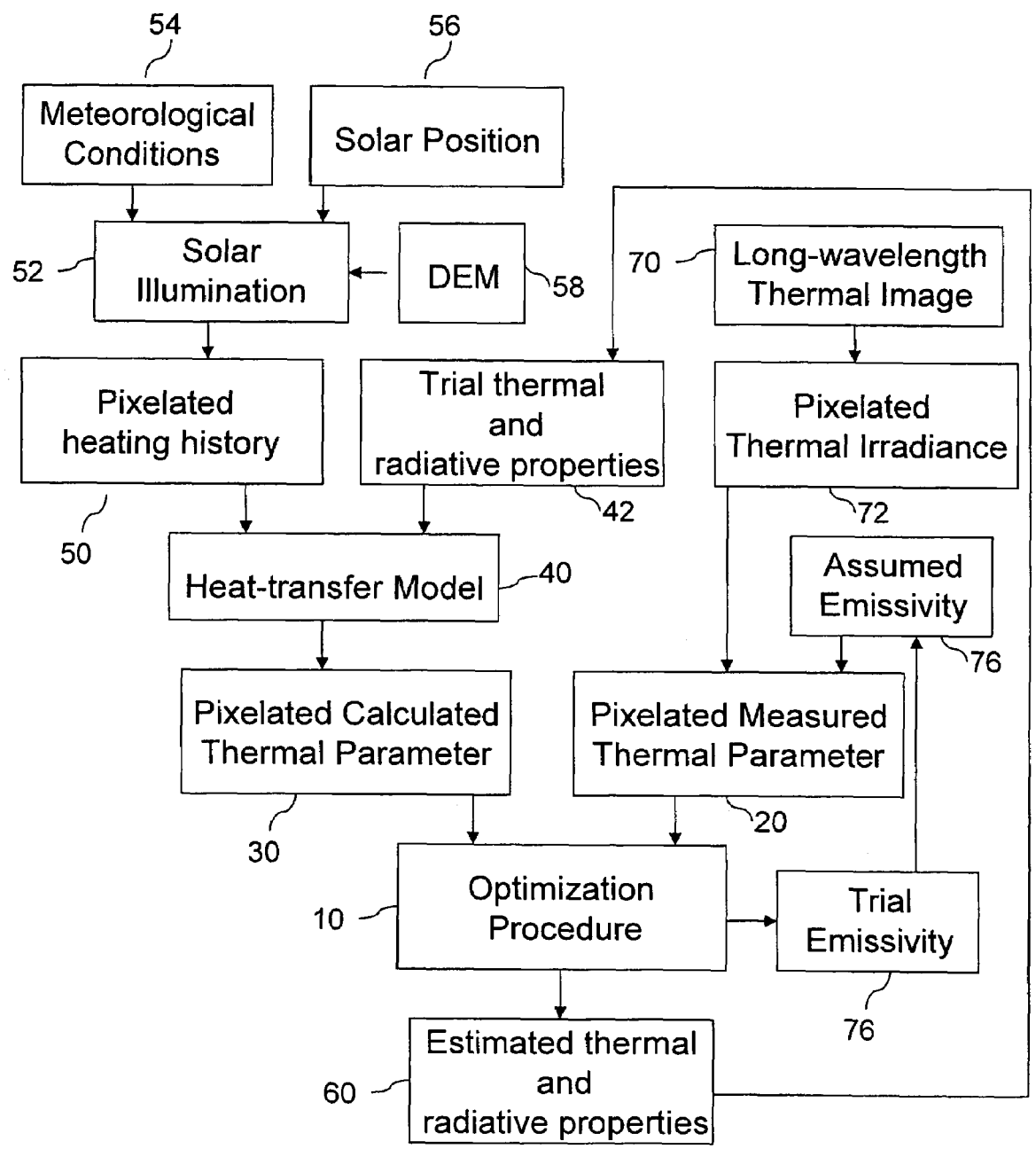
FIG. 1 illustrates an embodiment of the method of this invention.

The method of this invention, as illustrated for some embodiments in FIG. 1, uses the mathematical minimization (optimization) 10 of the difference between the pixelated ground point temperatures or irradiances (thermal parameters) 20 derived in some embodiments from remote-sensor thermal measurements 70 and the pixelated thermal parameters (temperatures or irradiances) 30 calculated by a heat-transfer model 40 using as inputs the trial thermal properties 42 of a surface material and the time-varying boundary conditions (for example, the heating history 50 resulting from variable solar illumination 52 throughout the day) that will determine the thermal parameters at the same time of day the image was collected. Factors that affect the solar illumination 52 include the solar position 56, meteorological conditions 54 such as clouds, and variations in terrain, which is expressed by means of the digital elevation model (DEM) 58. The embodiments of the method described herein employed a 1-dimensional heat-transfer model for simplicity; the method is applicable with higher-dimensional heat-transfer models as well. A long-wavelength thermal image 70 provides an array of pixelated emitted irradiances 72. An assumed value for the emissivity 74 is used to calculate an initial array of pixelated measured thermal parameters 20. The emissivity value is replaced by an improved trial value of emissivity 76 following each iteration of an optimization algorithm 10. The optimization algorithm or procedure 10 iteratively calculates the difference between measured 20 and calculated 30 thermal parameters using the heating history 50 and trial surface material properties 42. For each iteration, the trial material properties 42 are replaced with the estimated material properties 60 to reduce the difference between measured 20 and calculated 30 thermal parameters. The optimization algorithm halts when the thermal parameter difference is within a tolerance specified by the user. The trial surface material properties which obtain this minimum 60 are considered to be a good approximation of the actual surface material properties at the point of measurement on the earth surface. The method assumes that measured ground points in close proximity are composed of the same type of material. Two ways among others by which the ground points and corresponding pixels that fit this assumption can be determined is by using visible and near infra-red (VNIR) imagery from the same sensor or a different sensor. A variety of overhead platforms can be used for the sensor, including but not restricted to satellites, aircraft, unmanned aerial vehicles (UAVs), and elevated fixed platforms. In rough terrain, ground points located close together can be identified which have differing illumination histories due to the effects of terrain shading; for example, some points are in the direct sun all day and some are shaded all day or for portions of the day. These two criteria (same surface material, different illumination history) determine which ground points and their corresponding image pixels are used in the method. Some methods, among others, for identifying which pixels correspond to ground points composed of the same surface material include using a spatial and/or spectral cluster analysis, pattern analysis, and segmentation image processing methods applied to the original image or to transformations of the image, such as principal component (eigen-value or Karhunan-Loeve), various Fourier/Walsh, multi-resolution wavelet, adaptive and neural networks and tasseled-cap transforms, information theoretic methods as well as heuristic techniques and spectral band functions such as ratios of intensities of spectral bands and spectral indices. Additionally, image enhancement pre-processing methods such as spatially and spectrally local kernel band-pass, low-pass and high-pass filtering, image morphology and methods of data extraction used in image modeling and scene analysis are applicable. Additional possible methods for identifying which pixels correspond to ground points composed of the same surface material include robust spectral segmentation, iterative optimization clustering, and hierarchical agglomerative clustering applied to spectral and/or spatial image features. Using band intensity ratios as features would provide insensitivity to image illumination. Other possible features include those generated from application of principal component, wavelet, and related transforms. Robust spectral segmentation applies multi-band quantization to multi-spectral image features, which creates inherent local clusters. It uses local gradients in the feature intensity distribution to group local clusters into coarse clusters, which comprise segments of similar spectral characteristics. A nearest neighbor classifier can determine the cluster membership of every image pixel.

The steps in some embodiments of the invention are as follows:

Calculate the theoretical temperature history or heating history of selected ground points at the image site as a function of time using a heat-transfer model with time-varying boundary conditions. In some illustrative embodiments, a one-dimensional heat-transfer model with time-varying boundary conditions was used. Examples of possible time-varying boundary conditions include but are not restricted to heat flux at surface from sunlight, night re-radiation, and atmospheric effects. Inputs to this illustrative embodiment model include the following:

1. Solar illumination (input energy) time-history at each ground point. This depends upon the solar illumination at top of the atmosphere, the radiative transfer in the atmosphere, and the local surface topography. The solar illumination at the top of the atmosphere is a time-dependent function of the sun elevation and azimuth determined from an ephemeris, given the date and latitude of the ground site. The time and approximate location of the image collection are known. Radiative transfer in the atmosphere (mainly absorption) determines the radiance directly above the ground surface. The local topography is obtained from Digital Elevation Models (DEMs). Using the DEMs, the local (point-by-point) times of sunrise and sunset (which varies due to terrain shading), the effective illumination or incident energy (which varies as the ground surface normal found from the DEM), and the instantaneous incident angle of the solar radiation on this surface are determined. The heating history is the illumination time-history.

2. Thermal and radiative properties of the surface material. The relevant thermal properties are thermal conductivity and thermal capacity or, equivalently, thermal inertia and thermal diffusivity. The relevant radiative properties are emissivity and reflectance. In the simplest embodiments, the surface is assumed to be moisture-free and devoid of vegetation. In other embodiments, the effects of soil moisture and vegetation in surface temperature are included.

3. Atmospheric contributions. The effects of thermal atmospheric radiation and atmospheric heat conduction, which depends on wind speed and surface turbulence, are included in the illustrative model. Proper estimation of these effects limits the accuracy of the model. Horizontal heat flow in the ground is not modeled in the 1-dimensional model embodiments detailed herein, but can be incorporated in higher dimensional embodiments of this invention.

Determine the actual ground temperatures of the selected ground points from the thermal imagery. This employs a number of steps:

1. The ground points to be used are selected. One way among others by which this can be done is using the thermal and VNIR image that is also available from some LWIR sensors. Other methods of selecting ground points can be used. When using the sensor, the ground points are selected on the basis of similarity in the VNIR color signatures and should be in close proximity to insure that all the points are of the same surface material type. Multiple sets of ground points are obtained with the number depending on the number of different types of surface material. Each set corresponding to a different surface material can be modeled separately when more than one surface material type is present. It is desirable for the points to be located close to shadow lines (some within the shade and some fully illuminated) to provide different heating histories within the set. It is this differential heating of the same surface-material type that provides the statistical degrees-of-freedom used in the application of this method.

2. The latitude and longitude of each selected point is accurately determined using geo-rectification algorithms. This specifies the location of the corresponding points on the DEM which are to be used in the simulation.

3. The thermal irradiance leaving the ground points is determined. This is corrected for the losses caused by the intervening atmosphere and is corrected to include the calibration of the sensor.

Calculate the "measured" temperature of the ground point based on this irradiance and an assumed emissivity (ratio of actual emitted radiance to that of a black-body at the same temperature.) This is the same emissivity that is estimated in the optimization of surface material parameters using the heat-transfer model. To account for this, the "measured" ground temperature is calculated based on at-the-ground emitted radiation inside the iteration of the surface material parameter calculations using the trial emissivity. An equivalent procedure is to minimize the differences of the image-based "measured" surface irradiance to the "calculated" surface irradiance in the optimization algorithm. Once the emissivity is estimated, the ground temperatures can be calculated.

The two basic physical properties governing the flow of heat in materials are: 1) heat capacity (c), which is the amount of heat energy required to raise the temperature of a substance by a unit temperature interval; and 2) thermal conductivity (k), which is the rate at which heat passes through a given thickness of material with a given temperature gradient. An additional thermal property that is important in thermal remote sensing is thermal inertia (p)). This property is itself derived from the fundamental quantities of heat capacity, thermal conductivity and material density. It is typically written in the form $p=\sqrt{k\rho C}$, where the material's specific heat (C) is related to the density ($\rho$) and heat capacity (c) of the material by $c=\rho C$.

Thermal inertia defines the resistance of a material to a change in temperature for a given addition of heat energy. For example, surface materials with a high thermal inertia heated throughout a diurnal cycle will experience a smaller temperature change than will materials with lower thermal inertia. To avoid the difficulty associated with remote determination of thermal inertia, a simplification can be employed where the maximum temperature difference ($\Delta T$) over a given diurnal cycle is used. Using this simplification, the temperature difference is related to an approximate form of thermal inertia referred to as the material's apparent thermal inertia or ATI. Specifically, ATI is given by:

$$\Delta T = K \frac{S(1-A_0)}{ATI},$$

where S is the solar flux incident at the surface, $A_0$ is the apparent albedo, and K is a scaling factor often set to one. The term thermal inertia is used to include either actual thermal inertia or apparent thermal inertia.

When the surface material is rock, apparent thermal inertia (ATI) is affected by, among other factors, the mineralogy, porosity, and water content of the exposed surface of a rock mass. The rock mass porosity depends greatly on the natural porosity of the intact rock and the degree of fracturing of the rock mass. Thermal inertia can be very useful in discrimination of geologic units. For a given rock type, ATI can be correlated with variations of other physical rock properties such as density and porosity. A primary determinant of rock strength is the porosity of the rock. For a given rock type, therefore, it can be anticipated that an empirical relationship exists between rock strength, porosity, and thermal inertia.

A Multi-spectral Thermal Imager (MTI) operating with long-wave infrared radiation can provide good estimates of rock thermal properties. This depends on the exploitation of different heating histories of various pixels in a scene. Shading caused by adjacent rough topography gives rise to differential solar illumination heating of scene pixels.

Figure 2:
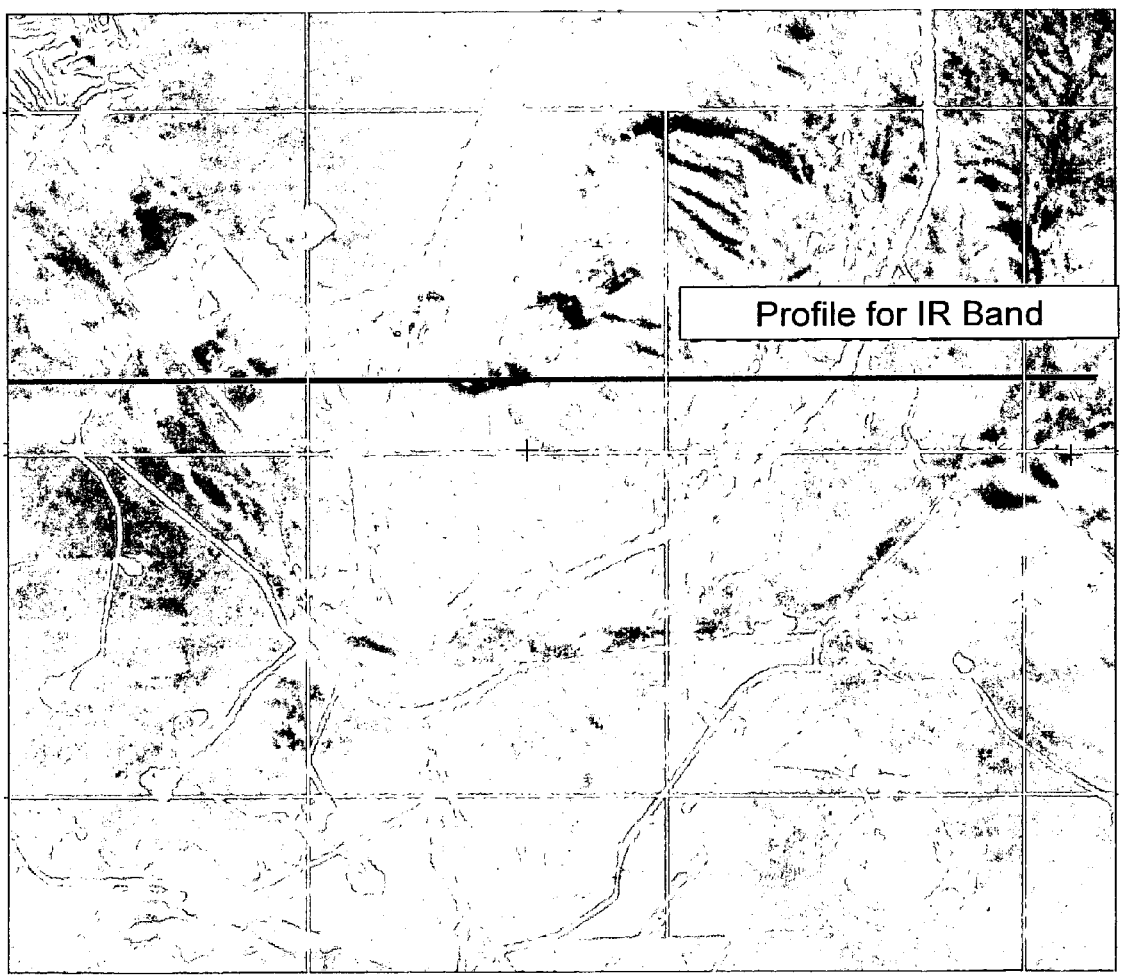
FIG. 2 is a visible and near-IR image of a surface region obtained using a multi-spectral thermal imaging satellite sensor.
Figure 3:
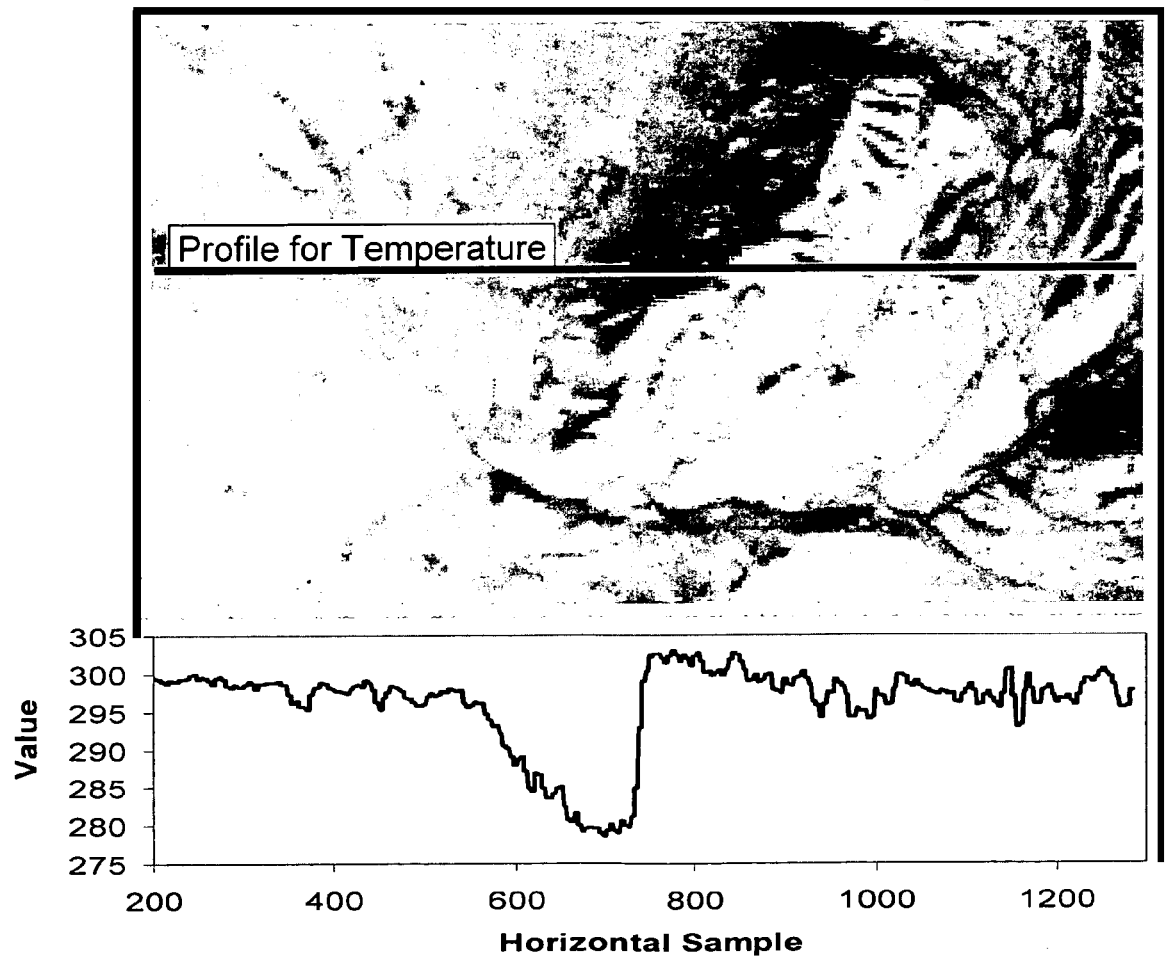
FIG. 3 is a long-wavelength image of the same location obtained using the same multi-spectral thermal imaging satellite sensor. The temperature variation, manifest as different emission intensities, resulting from different heating histories of ground points due to terrain shadowing is shown in the inset.

FIGS. 2 and 3 show examples of the differential heating of a surface due to shading. FIG. 2 is a gray-scale composite of an MTI VNIR (false color IR) image of a mountain peak and adjacent area. The topography of the area is evident from the shadows in the image. FIG. 3 is the LWIR image (10.425 μm band N) of the same collection location and time. Assuming a constant emissivity across the region, the darker LWIR pixels will correspond to regions with a lower temperature. For this image, these pixels also correspond to the shadowed ground samples made apparent in the false color VNIR image. The VNIR bands measure reflected solar radiance. The LWIR bands measure emitted thermal radiance of the ground surface. (The sun radiates negligible energy to be reflected in LWIR wavelengths.) Shaded pixels in the VNIR image correlate with colder pixels in the LWIR image because shaded regions have not warmed up as much as nearby pixel regions that are illuminated by the sun. In addition, the thermal profile in FIG. 3 shows that the pixels to the immediate west of the shadow exhibit a temperature gradient consistent with the length of time since local sunrise. This illustrates the use of temperatures corresponding to the pixels near the shadow to estimate the heating rate of the corresponding surface rock. These estimates require calculation of the terrain-modulated solar illumination as a function of time for the relevant ground pixels.

In an illustrative embodiment, a one-dimensional heat transfer model was used to estimate the thermal properties of the ground surface. The heat transfer model estimates the thermal parameters (temperature or irradiance) of the ground surface given rock (surface material) thermal properties and time-dependent boundary conditions, primarily solar illumination, including solar position and meteorological conditions such as cloud effects, and other meteorological conditions, such as, for example, air temperature, and wind speed. The solar illumination is calculated using a digital elevation model (DEM), which represents the local topography, and the solar ephemeris for the known location and date of the image. Finally, optimization methods are applied to search for the rock properties that produce the smallest difference between the modelled temperature (or irradiance) and the temperature (or irradiance) measured from the thermal image for each pixel near a selected shadowed region.

Inputs for applying the method:
Single thermal image (with shadows)—high spatial resolution of MTI permits exploitation of shadows.
Simulation of surface temperature as a function of surface material properties (for example, thermal inertia, heat capacity, thermal conductivity, porosity, reflectivity, and emissivity), solar illumination history, and weather conditions (that is, the IR response code).
DEM to provide times of sunrise and sunset for solar illumination history and surface normal of selected image pixels. (This sometimes implies that the image is ortho-rectified to match image and DEM points, that is, registered to the DEM. One can also determine geographic coordinates in the image to determine which DEM points to use.)
Atmospheric correction of image to provide surface radiance.
Optimization of surface-material properties to match simulated and measured pixel temperatures or radiances.

To be able to calculate the illumination history corresponding to each pixel of an image at the time the image is acquired, a significant input for determining thermal parameters from a single image is an accurate Digital Elevation Model (DEM). There are a variety of ways to generate a DEM. Historically, DEMs were generated by digitizing available paper contour maps, which were drawn from traditional surveys using triangulation and chain, sometimes combined with aerial photogrammetry. Modern survey techniques augment this using the Global Positioning System (GPS). One typical way to generate a DEM uses a stereo pair of aerial photographs that are sequentially captured using an airborne camera. This approach is also used with satellite imagery. However, the particular characteristics of satellite imaging using a stereo pair of sequentially captured images can sometimes cause difficulties in extracting a DEM. The ephemeris of the spacecraft (with respect to the ground test site during image collection) affects the elevation extraction process. When the angle of separation between the stereo images is small, the extraction process typically produces measurements with low accuracy. A large angle of separation can cause an excessive number of erroneous points in the output DEM. Also, significant variations in topography can introduce occluded areas in the images, preventing elevation calculations in the blind spots. Extracting elevation information from three or more images registered to the same ground area may reduce these problems and improve DEM accuracy. While DEMs acquired using standard approaches can be used with some embodiments of this invention, the problems of some of the standard approaches can be reduced with an imaging sensor with pointing capability that allows multiple images to be collected of the same area that are taken from different perspective views. The use of the same imaging sensor for generating the DEM and for obtaining the long-wavelength infrared thermal image reduces the uncertainty in obtaining proper positional registration between the pixels in the DEM and the pixels of the thermal image. The DEM extraction process can use multiple images that are geometrically corrected and registered to the same ground location. When an imaging sensor with pointing capabilities is used, one can acquire images with different image geometries. In some embodiments, for example, the images used to generate the DEM are obtained using the same multi-spectral imaging sensor that is used to obtain the long-wavelength infrared thermal image. The images used to generate the DEM can be images using wavelengths of light ranging from long-wavelength infrared to short-wavelength visible and near UV. The choice of wavelength can be guided by the spatial resolution of the DEM that is desired for a particular embodiment. The DEM is generated using photogrammetric elevation methods.

The theory of photogrammetry is based upon the concept of stereo triangulation. Stereoscopic imagery is defined as two perspective views of a three-dimensional object. Traditionally, the aircrafts motion creates the difference in imaging location for the two images. When matching points are identified in the overlapping regions from the two images, there is some inherent parallax associated with the two locations. Parallax, or disparity, is the difference in position of an imaged ground feature from one photo to the next, due to elevation and different perspective distortion in the two photos. Knowing the imaging geometries allows for the calculation of relative elevation.

The imaging geometries can be deduced from a knowledge of the actual ground geographic positions and elevations of a few points (Ground Control Points) identifiable in the images. Without accurate imaging geometry information the resulting DEM can contain scaling, rotation and tilting errors. If one of the images used in constructing the DEM is also the image used in the thermal properties determination, the scaling becomes irrelevant. The tilt can often be sufficiently corrected by inspection. With these errors "eliminated" the only problem remaining in using the "uncalibrated" DEM in calculating solor illumination is the error in the average geographic position of the entire scene. The accurate relative (or scaled) positional and elevation data will be sufficient to calculate the solar illumination of points intrinsically registered in the thermal image. The effect of absolute location accuracy can be minimized by knowing the approximate position of the imaged ground. Also, corrections can be found by comparing shadows in the VNIR image (collected simultaneously with the LWIR image used) with synthetic shadows generated from the scaled/tilted DEM.

The standard DEM extraction techniques can extend naturally to other imaging sensors. If the imaging system is well defined, and the position and orientation of the imaging platform are accurately known, a line of sight can be generated for ever pixel in the image. When two or more images are collected from different perspectives, matching pixel locations can be identified in the images. Using the line of sight from the multiple pixel positions, the location where the look vectors intersect in three dimensional space can be calculated. Repeating this process for every pixel can calculate the elevation across the entire image and build an absolute DEM for the image.

This method can used to generate an elevation model from multiple images for any imaging sensor, as long as there is separation between the collection locations and the imaging geometry is accurately known.

Alternative methods for generating DEMs include but are not restricted to synthetic aperture radar (SAR), interferometric SAR, and Light Detection and Ranging (LIDAR). Both digital elevation models and digital terrain models can be employed in embodiments of this invention.

There are some advantages of this method of surface-material property determination.
It needs only a single daytime image (eliminating problem of matching day/night pixels for comparison and the time lag between day/night collections).
Emissivity can be estimated as part of optimization.
Actual thermal inertia, a physical rock property, is determined.

There are some issues to be considered in determining when the application of the method is appropriate.

It requires areas of differential heating histories; this implies a rough terrain to provide shading.

Basic simulation models are valid for dry, bare rocks. Modelling moisture and vegetative cover increases the complexity of the modelling process.

Accurate ortho-rectification or registration to the DEM of the image in rough terrain is important.

Accurate atmospheric correction is important.

Different rock types subjected to varying solar/shade histories display measurable temperature differences at a particular time of day. The following describes a method to estimate the rock parameters using radiance/temperature information estimated from multi-spectral thermal imagery. For a given set of MTI pixels, the sun/shade history from the known collection time, solar ephemeris, and DEM of the local topography is predicted. With this predicted solar history and an initial estimate of the surface-material parameters, a thermal model is applied to predict the radiance/temperature of the surface material, such as, for example, rocks. An iterative optimization code is applied to search for the set of surface-material parameters that minimizes the deviation between the model-predicted radiance/temperature and the MTI-measured radiance/temperature. Two measures of deviation include mean square difference and least absolute deviation. Other methods of determining statistical similarity include, but are not limited to, classical statistical tests as well as correlation. Two surface-material parameters considered are the thermal conductivity (k) and thermal capacity ($\rho C$). Equivalently, the surface material's thermal inertia (p) and thermal diffusivity ($\alpha$) can be used. Any combination of two of these parameters, can be used to calculate the others using the following relationships:

$$\alpha = \sqrt{\frac{k}{\rho C}}$$

$$P = \sqrt{k \rho C}$$

where conductivity=k; capacity=$\rho C$; thermal inertia=P; and thermal diffusivity=$\alpha$.

Two other surface-material parameters of interest are the emissivity and VNIR reflectance. These parameters can be iteratively optimized to obtain estimated values. The emissivity and/or reflectance can also be estimated directly from the spectral radiance image; these estimated parameters can be provided as inputs to the optimization.

In some embodiments of the invention, the following steps are included:

1. Obtain one or more multi-spectral thermal (MT) images of the target area.
2. Obtain a DEM of the area. This can be done using the MT images or can be generated independently of the MT images.
3. Select regions of interest (ROI) in the image adjacent to terrain-induced shadows.
4. Apply robust spectral segmentation algorithms to visible, near-infrared (NIR), and/or short-wavelength infrared (SWIR) bands to segment regions of spectrally similar materials within the ROI; it is assumed that every pixel in a segment has the same surface-material parameters. From the shape of the reflectance spectra, it is possible to predict the general class of surface-material type.
5. Perform radiance calibration and atmospheric corrections to estimate the VNIR reflectance and emitted thermal radiance (or, alternatively, temperature and emissivity) of each pixel in the ROI. Estimation accuracy can be improved sometimes by minimizing image re-sampling.
6. Calculate sunrise and sunset times for the pixels in the ROI using the DEM, location, and date of image collection,
7. Apply an optimization algorithm to estimate the surface-material parameters that minimize the chosen deviation measurement between the MTI-estimated thermal radiances and the thermal-model-predicted radiances to within the user-defined tolerances. The deviation measurement can be a mean-square difference, least absolute deviation, or other methods of determining statistical similarity including, but are not limited to, classical statistical tests as well as correlation.

The method finds values of surface material thermal properties (emissivity, reflectance, thermal conductivity, and thermal capacity or alternatively emissivity, reflectance, thermal inertia, and thermal diffusivity) which minimize the difference between "measured" irradiance and "calculated" irradiance from the set of selected ground points. Additional material properties such as moisture content and porosity can be obtained using more comprehensive thermal transfer models that adequately incorporate the material properties in predicting surface thermal parameters. Many algorithms are available for constrained optimization in accordance with this invention. The embodiments of the invention described herein used a Fletcher-Reeves conjugate gradient algorithm with bound constraints from the CONMIN package of the Sandia National Laboratories-developed DAKOTA optimization software. In some embodiments, the variables are scaled to the same approximate order of magnitude.

One desirable feature of the method of this invention is the use of a single measurement to provide the data necessary for determining surface material properties that can enable identification of surface materials by comparison of known surface material properties to the surface material properties determined by this method. For a given date and time of day, the same type of ground material will be heated to different temperatures, dependant upon its thermal properties, if they receive different amounts of sunshine due to relative terrain shading. These temperatures can be calculated for bare, dry ground using a description of the terrain (a DEM), the solar ephemeris, and the thermal properties of the ground material. We can effectively measure the ground temperatures using a long-wave thermal remote sensor and compare these temperatures to those calculated using various sets of thermal properties. The set of thermal properties that gives the closest match to the measured temperatures provides the best estimate of the actual surface material thermal properties, under the relevant assumptions. The embodiments described herein employed a one-dimensional heat-transfer model with simple vegetation and soil moisture contributions, but the method is equally applicable with more complicated higher-dimensional models and more complex vegetation and soil moisture contributions. Each independent variable (i.e. physical property) included in a more complicated prediction model can then be estimated by including it in the optimization calculation.

The spatial resolution is determined primarily by the optical resolution of the image. For an imaging sensor, the resolution to first order is limited in part by the pixel dimensions. Improved resolution resolution can be obtained by applying a spectral derivative filter or a spatial derivative filter. A method for achieving subpixel resolution is using supersampling. This method employs micro-scanning, which uses the flexible pointing capability of the sensor and an optical system capable of higher resolution that that delimited by the pixel size. The imaging sensor is moved by slight, subpixel amounts to generate sub-Nyquist data sets which are then processed to generate a supersampled image. For example, if the imaging sensor collects four slightly offset images, these can be processed to produce a 4-fold increase in resolution. The imaging sensor's point spread function is used to deconvolve the supersampled image to yield an increase in the spatial resolution. The higher-resolution supersampled image is used as the basis for determining surface material parameters. Other techniques known to those of skill in the art can also be used to improve the resolution of the image employed in embodiments of this invention.

It should be apparent that there are many modifications possible with this invention. It is intended that the scope of the invention be defined by the appended claims.

What is claimed is:

1. A method for estimating thermal properties using a single long-wave infrared thermal image, the method comprising:
    positioning a sensor to define a field of view of the sensor;
    generating an array of measured emitted irradiances utilizing a long-wave infrared thermal image generated by the sensor, each element of the array corresponding to one of a plurality of locations within the field of view, the plurality of locations comprising a material with a set of thermal properties and radiative properties;
    calculating an array of pixelated measured thermal parameters from the array of measured emitted irradiances;
    calculating using a heat-flow model an array of pixelated calculated thermal parameters corresponding to each of the plurality of locations, the heat-flow model using a digital elevation model, a solar illumination model, and a set of estimated thermal properties and estimated radiative properties;
    varying the set of estimated thermal properties and estimated radiative properties used for calculating the pixelated calculated thermal parameters to minimize an array of differences between the array of pixelated measured thermal parameters and the array of pixelated calculated thermal parameters; and
    generating a terrain map indicative of thermal and radiative properties of the material at the plurality of locations within the field of view using the set of estimated thermal and radiative properties that minimize the array of differences for each of the plurality of locations within the field of view.

2. The method of claim 1, further comprising selecting the plurality of locations comprising the material using at least one of a near-infrared image and a visible image obtained using a multi-spectral imaging sensor.

3. The method of claim 1, further comprising selecting the plurality of locations comprising the material using a ratio of intensities of spectral bands obtained using a multi-spectral imaging sensor.

4. The method of claim 1, further comprising selecting the plurality of locations comprising the material using robust spectral segmentation with imagery from a multi-spectral imaging sensor.

5. The method of claim 1, further comprising selecting the plurality of locations comprising the material using a cluster analysis method to identify locations comprising the material.

6. The method of claim 1, further comprising selecting the plurality of locations comprising the material using a technique selected from the group consisting of spatial cluster analysis, spectral cluster analysis, pattern analysis, principal component analysis, eigen-value principal component analysis, Fourier/Walsh analysis, Karhunan-Loeve principal component analysis, multi-resolution wavelet analysis, adaptive network analysis, neural network analysis, tasseled-cap transform analysis, Information theoretic methods, spectral band intensity ratio analysis, spectral indices analysis, and signal orthogonalization techniques.

7. The method of claim 1, wherein the long-wave infrared thermal image is obtained using a multi-spectral thermal imaging satellite sensor.

8. The method of claim 1, wherein the long-wave infrared thermal image is obtained using a multi-pixel thermal sensor mounted on an overhead platform.

9. The method of claim 1, wherein the long-wave infrared thermal image is an enhanced resolution thermal image generated by supersampling.

10. The method of claim 1, further comprising applying supersampling to a measured long-wave infrared thermal image to produce a subpixel-resolution long-wave infrared thermal image for use as the long-wave infrared thermal image.

11. The method of claim 1, further comprising applying at least one of a spectral derivative filter and a spatial derivative filter to a measured long-wave infrared thermal image to produce an improved-resolution long-wave infrared thermal image for use as the long-wave infrared thermal image.

12. The method of claim 1, wherein the digital elevation model is constructed using interferometric synthetic aperture radar.

13. The method of claim 1, wherein the digital elevation model is generated using a plurality of images obtained using a multi-spectral imaging satellite sensor.

14. The method of claim 1, wherein the digital elevation model is generated using a plurality of images obtained using a multi-spectral imaging sensor and applying statistical photogrammetric elevation methods, the multi-spectral imaging sensor also being used to obtain the long-wave infrared thermal image.

15. The method of claim 1, wherein the set of estimated thermal properties and estimated radiative properties comprise at least one of the group consisting of thermal conductivity, thermal capacity, thermal inertia, thermal diffusivity, reflectance, and emissivity.

16. The method of claim 1, further comprising identifying the material by comparing at least one of the set of estimated thermal properties and estimated radiative properties with at least one known property of a surface material.

17. The method of claim 1, wherein the sensor is mounted on a platform selected from a satellite, an aircraft, an unmanned aerial vehicle, and an elevated fixed platform.

* * * * *